United States Patent [19]

König et al.

[11] 4,371,630
[45] Feb. 1, 1983

[54] SOLUTION OF A POLYURETHANE IN A POLYOL AND A PROCESS FOR USING SUCH A SOLUTION IN THE PRODUCTION OF POLYURETHANE PLASTICS

[75] Inventors: Klaus König, Leverkusen; Hans-Walter Illger, Rösrath; Peter Seifert, Bergisch-Gladbach; Holger Meyborg, Odenthal, all of Fed. Rep. of Germany

[73] Assignee: Bayer Aktiengesellschaft, Leverkusen, Fed. Rep. of Germany

[21] Appl. No.: 236,949

[22] Filed: Feb. 23, 1981

[30] Foreign Application Priority Data

Mar. 6, 1980 [DE] Fed. Rep. of Germany ....... 3008590

[51] Int. Cl.$^3$ .................. C08G 18/14; C08G 18/32; C08G 18/42
[52] U.S. Cl. ........................... 521/173; 252/182; 521/172; 521/914; 156/274.4; 156/308.2
[58] Field of Search ................ 521/172, 173, 914; 252/182

[56] References Cited

U.S. PATENT DOCUMENTS 3,360,495 12/1967 Muller et al. ............... 260/33.2
4,093,569 6/1978 Reischl et al. .............. 260/2.5 AM
4,147,680 4/1979 Reischl et al. .............. 260/29.2 TN

FOREIGN PATENT DOCUMENTS 1553760 10/1979 United Kingdom .

*Primary Examiner*—H. S. Cockeram

*Attorney, Agent, or Firm*—Gene Harsh; Joseph C. Gil; Lyndanne M. Whalen

[57] ABSTRACT

A solution of a polyurethane in a polyol is made from (a) the reaction product of a polyisocyanate and a diprimary diol, and (b) a polyether in which the reaction product constitutes from 3 to 60 wt. % of the solution. Suitable diprimary diols have a molecular weight of from 90 to 800 and a structure at both hydroxyl groups corresponding to the general formula:

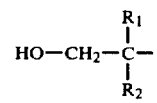

in which
R$_1$ represents chlorine, an alkyl, cycloalkyl, aralkyl or aryl radical having from 1 to 10 carbon atoms, which carbon atoms may be substituted or interrupted by chlorine, ester groups, ether groups, amide groups, urethane groups or nitrile groups, and
R$_2$ represents hydrogen or a radical within the definition of R$_1$.

Polyethers which may be employed have at least two hydroxyl groups (at least 80% of which are secondary hydroxyl groups) and an average molecular weight of from 500 to 12,000. The disclosed solutions are particularly useful in the production of flexible polyurethane plastics which are suitable for flamecoating and high frequency bonding.

20 Claims, No Drawings

SOLUTION OF A POLYURETHANE IN A POLYOL AND A PROCESS FOR USING SUCH A SOLUTION IN THE PRODUCTION OF POLYURETHANE PLASTICS

BACKGROUND OF THE INVENTION

The present invention relates to a solution of a polyurethane in a high molecular weight polyether having terminal hydroxyl groups. Such a solution may be used as a modified polyol in the production of polyurethane plastics.

Dispersions of polyisocyanate polyaddition products in polyols are known. For example, German Auslegeschrift No. 1,168,075 teaches a process in which diisocyanates are reacted in situ with difunctional, diprimary alcohols in a polyether dispersing medium. The polyether used in the disclosed process must have a molecular weight of from 500 to 3,000 and at least two secondary hydroxyl groups in the molecule. Since primary alcohols react more rapidly with isocyanates then do secondary alcohols, only the bifunctional, primary alcohols take part in the polyaddition reaction. The higher molecular weight polyether with secondary hydroxyl groups, therefore, serves as a virtually inert reaction medium. The product polyurethane is in the form of finely dispersed particles and does not deposit sediment, even after a comparatively long standing time.

German Offenlegungsschriften Nos. 2,550,796 and 2,550,797 teach stable dispersions of polyisocyanate polyaddition products in compounds having hydroxyl groups as the dispersing agent. These dispersions are obtained by an in situ reaction of polyisocyanates with a variety of active hydrogen containing compounds in the presence of specified quantities of water. Among the disclosed reactions is the reaction of diisocyanates with diprimary diols in polyethers having secondary hydroxyl groups to form dispersions of finely divided polyurethane particles.

When dispersions of organic fillers in higher molecular weight hydroxyl compounds are used as starting materials for the production of polyurethane plastics, some of the properties of the plastic are greatly improved. For example, increased hardness and improved heat resistance may be achieved without detrimentally affecting the other properties of the plastic, but these improvements are limited in the same manner as improvements due to use of other "active fillers." The properties of the polyurethane platics produced from various dispersions of different organic fillers in higher molecular weight hydroxyl compounds are (with certain limitations) independent of the chemical nature of the filler where the filler used in each dispersion has a particle size and concentration comparable to that of the other fillers in the other dispersions. Thus, use of acrylonitrile-styrene-copolymers, polyhydrazo-dicarbonamides, polyureas, ureaformaldehyde resins and high melting polyesters as fillers may produce results which are substantially the same.

A dispersed filler would have a greater effect upon the properties of the product plastic if the higher molecular weight additives mentioned could be incorporated homogeneously into the polyurethane. However, such homogeneous incorporation is generally unattainable because these additives are insoluble in the starting materials used in preparing polyurethanes.

Solutions of polyisocyanate polyaddition compounds in polyols are also known to those in the art. In German Offenlegungsschrift No. 2,638,759, e.g., such polyisocyanate polyaddition solutions having a solids content of from 5 to 70% by weight are described. These solutions are produced by reacting diisocyanates with compounds which contain active hydrogen atoms (e.g., diprimary diols) in a reaction medium which is a polyhydric alcohol having a molecular weight of between 62 and 450 (generally between 62 and 200). These polyisocyanate polyaddition solutions were also prepared by dissolving the pulverized polyaddition compounds (which had been previously prepared) in the polyhydric alcohols described above.

While such polyisocyanate polyaddition solutions may be used as starting materials in the production of polyurethane plastics, they are unsuitable for preparing flexible elastomers, flexible coatings and flexible foamed plastics. Flexible products cannot be made with these solutions because addition of the appropriate amount of polyaddition compound results in the presence of comparatively large quantities of the solvent low molecular weight polyhydric alcohol. Such quantities of the solvent alcohol make the product polyurethane plastics undesirably brittle.

It would be particularly advantageous, therefore, to have solution of a polyurethane in a polyol which could be used in making flexible elastomers, coatings and foamed plastics.

SUMMARY OF THE INVENTION

It is an object of the present invention to provide a solution of a polyurethane in a polyol.

It is a further object of this invention to provide a solution of a polyurethane in a polyol which may be used in making flexible elastomers, coatings and foamed products.

It is another object of this invention to provide a process for the production of cellular polyurethane plastics by reacting polyisocyanates with higher molecular weight polyhydroxyl compounds in which a solution of polyurethane in a polyol is used as the higher molecular weight polyhydroxyl compound. Other compounds which are reactive toward isocyanates, catalysts and additives known to those in the art may also be included in the reaction mixture.

Another object of this invention is the production of flame-coatable and high frequency bondable flexible foamed polyurethane plastics by reacting polyisocyanates with higher molecular weight compounds having at least two hydroxyl groups. These hydroxy compounds may be in admixture with other higher and/or lower molecular weight compounds which contain hydrogen atoms reactive towards isocyanates. Water, other blowing agents, catalysts, foam stabilizers and other additives may be used in making a foam from a solution of a polyurethane in a polyol, which solution is used either exclusively or in part as the higher molecular weight compound.

These and other objects which will become apparent to those skilled in the art are accomplished with a solution of a polyurethane in a polyol made from (a) the reaction product of a polyisocyanate and a diprimary diol and (b) a polyether having at least two hydroxyl groups, which hydroxyl groups are predominantly secondary. The reaction product (a) is present in an amount which is from 3 to 60 wt.% of the solution. Diprimary diols which may be used have a molecular weight of from 90 to 800 and have at both hydroxyl groups the structure represented by the formula:

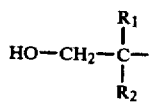

wherein
- $R_1$ represents chlorine, an alkyl, cycloalkyl, aralkyl or aryl radical having from 1–10 carbon atoms, which carbon atoms may be substituted or interrupted by chlorine, ester groups, ether groups, amide groups, urethane groups and/or nitrile groups, and
- $R_2$ represents hydrogen or a radical within the definition of $R_1$.

The polyether component of this solution should have an average molecular weight of from 500 to 12,000. Further, at least 80% of the hydroxyl groups present in the ether should be secondary hydroxyl groups.

Surprisingly, it has been found that by reacting diisocyanates with diprimary diols in higher molecular weight polyethers having predominantly secondary hydroxyl groups, clear solutions of polyurethanes in the higher molecular weight polyethers can be obtained, if the diprimary diols used have the structural features described above.

It has also surprisingly been found that such polyurethane solutions may be used to produce polyurethane foamed plastics which are particularly suitable for flame-coating and high frequency bonding and which plastics also have improved physical properties. When using the above-described solutions, completely open-celled in situ "reticulated" polyurethane flexible foamed plastics are produced which have outstanding properties.

DETAILED DESCRIPTION OF THE PRESENT INVENTION

The present invention comprises from 3 to 60% by weight, preferably from 5 to 30% by weight (based on the total solution) of the reaction products of a polyisocyanate with a diprimary diol having a molecular weight of from 90 to 800, preferably from 104 to 500, which has at both hydroxyl groups the following structure:

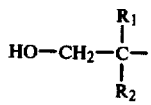

in which
- $R_1$ represents chlorine or an alkyl, cycloalkyl, aralkyl or aryl radical having from 1 to 10 carbon atoms, which may be substituted or interrupted by chlorine, ester groups, ether groups, amide groups, urethane groups or nitrile groups, and
- $R_2$ represents hydrogen or a radical within the definition of $R_1$, and a polyether having at least two hydroxyl groups, with an average molecular weight of from 500 to 12,000, preferably from 1,000 to 8,000. At least 80%, and preferably at least 90%, of the hydroxyl groups of this polyether are secondary.

Diols having a molecular weight of from 104 to 800 which have the above-described structural unit at only one hydroxyl group may also be included in the polyurethane solution. These diols should not, however, be used in an amount which is greater than 50 mol % of the total diol content. Alcohols which do not have the molecular weight and/or structure of the diols described above may also be included in the polyurethane solution. These alcohols should not, however, be present in amounts greater than 20 mol % of the total diol content.

The solutions of the present invention may be prepared from aliphatic, cycloaliphatic, araliphatic, aromatic and heterocyclic polyisocyanates. Suitable polyisocyanates are described by W. Siefken in Justus Liebig's *Annalen der Chemie*, 562, pages 75 to 136. The polyisocyanates described therein include those of the formula:

$$Q(NCO)_n$$

in which
- n represents from 2 to 4, preferably 2, and
- Q represents an aliphatic hydrocarbon radical having from 2 to 18, preferably 6 to 10, carbon atoms; a cycloaliphatic hydrocarbon radical having from 4 to 15, preferably 5 to 10, carbon atoms; an aromatic hydrocarbon radical having from 6 to 15, preferably 6 to 13, carbon atoms; or an araliphatic hydrocarbon radical having from 8 to 15, preferably 8 to 13, carbon atoms.

Specific examples of such polyisocyanates are: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and any mixture of these isomers; 1-isocyanato-3,3,5-trimethyl-5-isocyanatomethylcyclohexane (see German Auslegeschrift No. 1,202,785 and U.S. Pat. No. 3,401,190); 2,4- and 2,6-hexahydrotoluylene diisocyanate and any mixture of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-toluylene diisocyanate and any mixtures of these isomers; diphenylmethane-2,4'- and/or 4,4'-diisocyanate or naphthalene-1,5-diisocyanate.

The following polyisocyanates may also be used in making the solution of the present invention: triphenylmethane-4,4',4''-triisocyanate; polyphenyl polymethylene polyisocyanates (which can be obtained by aniline-formaldehyde condensation and subsequent phosgenation as described, for example, in British Pat. Nos. 874,430 and 848,671); m- and p-isocyanato phenyl sulfonyl isocyanates (taught in U.S. Pat. No. 3,454,606); perchlorinated aryl polyisocyanates (as described in German Auslegeschrift No. 1,157,601 and U.S. Pat. No. 3,227,138); polyisocyanates having carbodiimide groups (as described, for example, in German Patent 1,092,007 (U.S. Pat. No. 3,152,162) and also in German Offenlegungsschriften Nos. 2,504,400; 2,537,685 and 2,552,350); norboran diisocyanates (according to U.S. Pat. No. 3,492,330); polyisocyanates having allophanate groups (as described, for example, in British Pat. No. 994,890; Belgian Pat. No. 761,626 and Dutch Patent Application 7,102,524); polyisocyanates having isocyanurate groups (as described, for example, in U.S. Pat. No. 3,001,973; German Pat. Nos. 1,002,789; 1,222,067 and 1,027,394 and German Offenlegungsschriften Nos. 1,929,034 and 2,004,048); polyisocyanates having urethane groups (as described, for example, in Belgian Pat.

No. 752,261 and U.S. Pat. Nos. 3,394,164 and 3,644,457); polyisocyanates having acylated urea groups (according to German Pat. No. 1,230,778); polyisocyanates having biuret groups (as described, for example, in U.S. Pat. Nos. 3,124,605 and 3,201,372 and British Pat. No. 889,050); polyisocyanates prepared from telomerization reactions (as described, for example, in U.S. Pat. No. 3,654,106); polyisocyanates having ester groups (as mentioned, for example, in British Pat. Nos. 965,474 and 1,072,956; U.S. Pat. No. 3,567,763 and German Pat. No. 1,231,688); reaction products of the above isocyanates with acetals (according to German Pat. No. 1,072,385) and polyisocyanates containing polymeric fatty acid esters (according to U.S. Pat. No. 3,455,883).

It is also possible to use the distillation residues produced in the commercial preparation of isocyanates which contain isocyanate groups. Such residues may be dissolved in one or more of the above-mentioned polyisocyanates. It is also possible to use mixtures of any of the above-mentioned polyisocyanates. Monoisocyanates, especially those combined with polyfunctional (for example, tri- and tetrafunctional) isocyanates may also be used in minor quantities.

Isocyanates which are preferred for the preparation of the solutions of the invention are the isomeric toluylene diisocyanates and diphenylmethane diisocyanates, hexamethylene diisocyanate and 1-isocyanato-3,3,5-trimethyl-5-isocyanatomethyl cyclohexane or mixtures of these isocyanates. 2,4- and/or 2,6-toluylene diisocyanate are particularly preferred.

Other polyisocyanates which may be used in amounts of up to approximately 30 mol % of the total polyisocyanate content (but which are generally less preferred) are the so-called "NCO-prepolymers", i.e. reaction products having terminal isocyanate groups made from higher and/or lower molecular weight compounds having at least two hydrogen atoms which are reactive toward isocyanates and an excess of polyisocyanate. The above-mentioned higher molecular weight compounds having at least two hydrogen atoms which are reactive toward isocyanates have a molecular weight of approximately 400 to 2,000. Suitable compounds include those having amino groups, thiol groups or carboxyl groups (preferably polyhydroxyl compounds), polyesters having from 2 to 4 hydroxyl groups, polyethers, polythioethers, polyacetals and polycarbonates and polyester amides which are known to those in the art to be suitable for the preparation of homogeneous and cellular polyurethanes. Such compounds are described in detail in German Offenlegungsschriften Nos. 2,550,796; 2,550,797; 2,638,759; 2,624,527; 2,302,564 (U.S. Pat. No. 3,963,679); 2,402,840 (U.S. Pat. No. 3,984,607); 2,457,387 (U.S. Pat. Nos. 4,035,213); 2,829,670; 2,830,949 and 2,830,953.

In the preparation of NCO-prepolymers, compounds having at least two hydrogen atoms which are reactive toward isocyanates, with a molecular weight of from 32 to 400 may also be included. These compounds include those containing hydroxyl groups and/or amino groups and/or thiol groups and/or carboxyl groups. It is preferred that these compounds contain hydroxyl groups with known chain-lengthening agents or crosslinking agents being particularly preferred. Such low molecular weight compounds are also described in the above listed publications. These compounds usually contain from 2 to 4 (preferably 2 or 3) hydrogen atoms which are reactive toward isocyanates.

The solutions according to the present invention may be prepared directly by reacting a polyisocyanate in a polyether with diprimary diols which have the structural feature defined above at both hydroxyl groups in accordance with a procedure such as that described in German Auslegeschrift No. 1,168,075 or German Offenlegungsschrift No. 2,638,759. Examples of such diols are: 1,3-propane diols which are disubstituted in 2-position such as 2,2-dichloro-1,3-propane diol; 2,2-dimethyl-1,3-propane diol (neopentyl glycol); 2-methyl-2-ethyl-1,3-propane diol; 2,2-dimethyl-1,3-propane diol; 2,3-dichloromethyl-1,3-propane diol; 2-methyl-2-isopropyl-1,3-propane diol; 2-methyl-2-chloromethyl-1,3-propane diol; 2-ethyl-2-chloromethyl-1,3-propane diol; 2,2-diisopropyl-1,3-propane diol; and also homologues having higher substituents $R_1$ and/or $R_2$ corresponding to the above-given definition.

1,3-propane diols which are monosubstituted in the 2-position such as 2-chloro-1,3-propane diol; 2-methyl-, 2-chloromethyl-, 2-ethyl-, 2-isopropyl-, 2-cyclohexyl- or 2-phenyl-1,3-propane diol and homologous compounds may also be used in the present invention.

Other suitable diols are compounds which are derived from 1,1,1-tris-hydroxymethyl alkanes such as trimethylol ethane and trimethylol propane, in which a hydroxyl group is reacted (1) with monoisocyanates and converted into urethanes or (2) with monocarboxylic acids and converted into esters. Derivatives of pentaerythritol which have been twice reacted with monoisocyanates or monocarboxylic acids are also useful. In that case it is not necessary to have the pure reaction compounds, but the resulting statistical mixtures out of the 1:1 or 1:2 reaction may be used also. Examples of monoisocyanates which may be reacted wih a 1,1,1-tris-hydroxymethyl alkane are: methyl, ethyl, isopropyl, butyl, cyclohexyl, ω-chlorohexyl, isooctyl, stearyl and phenol isocyanate and also phenyl isocyanates which are substituted by chlorine and/or methyl groups. Monocarboxylic acids which may be reacted with the 1,1,1-tris-hydroxymethyl alkane include: formic acid, acetic acid, propionic acid, acrylic acid, methacrylic acid, butyric acid, 2-ethyl caproic acid, stearic acid, oleic acid, cyclohexane carboxylic acid and benzoic acid and also substituted benzoic acids.

Low molecular weight condensates having terminal hydroxyl groups (i.e., those having a molecular weight up to 800) are also diols suitable to the practice of the present invention. More particularly, condensates of the 1,3-propane diol and 1,1,1-tris-hydroxymethyl alkanes described above and mixtures thereof with a dicarboxylic acid may be used. Suitable dicarboxylic acids which may be used in forming the condensate include: oxalic acid, malonic acid, succinic acid, glutaric acid, adipic acid, azelaic acid, sebacic acid, phthalic acid, isophthalic acid or 3-hydroxy-2,2-dimethyl-propionic acid (hydroxy pivalic acid) and mixtures thereof. Low molecular weight polyadipates of neopentyl glycol and also 3-hydroxy-2,2-dimethylpropionic acid-3-hydroxy-2,2-dimethyl-propyl ester (hydroxy pivalic acid-neopentyl glycol ester) are preferred.

The preferred diols are 1,3-propane diols which are disubstituted in the 2-position (particularly neopentyl glycol), the low molecular weight condensates described in the preceding paragraph and also the reaction product of trimethylol propane and ω-chlorohexyl isocyanate.

In the preparation of the dissolved polyurethane, a diol having the structure:

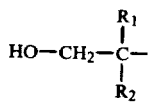

(in which $R_1$ and $R_2$ are as defined above) at only one of the hydroxyl groups may also be included. Such a diol should not, however, be used in an amount greater than 50 mol % of the total diol content. Examples of such diols are: 3-chloro-1,2-propane diol; 2-ethyl-1,3-hexane diol; 2,4-trimethyl-1,3-pentane diol and 2,4- and 2,4,4-trimethyl-1,6-hexane diol.

Mono-, di- or polyfunctional alcohols which do not have a molecular weight of from 90 to 800 and the structure:

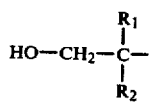

(in which $R_1$ and $R_2$ are as defined above) may also be included in the polyurethane solution. These alcohols should not, however, be used in an amount which is greater than 20 mol % of the total diol content. Inclusion of these alcohols is not generally desirable because, in some cases, an undesired turbidity in the polyurethane solution results. However, such alcohols may be useful when specific groups, e.g., tertiary amino groups, or branching points are to be introduced into the polyurethane solution.

The polyurethane solutions according to the invention may be produced directly by reacting an isocyanate of the type described previously with one or more of the above-described diols in a polyether which serves as both reaction medium and solvent. Appropriate polyethers have at least two hydroxyl groups, which groups are predominantly secondary hydroxyl groups. These polyethers have an average molecular weight of from 500 to 12,000, preferably from 1,000 to 8,000. Polyeters of this type may be prepared by methods known to those in the art. One such method is an alkaline catalyzed polymerization of propylene oxide, in which up to 30 mol % of ethylene oxide (based on starting materials having reactive hydrogen atoms) is used. Starting materials which are suitable for the production of polyethers are: water; ethylene glycol; 1,2- or 1,3-propylene glycol; 1,2-, 1,3- or 1,4-butylene glycol; 1,6-hexane diol; 1,8-octane diol; neopentyl glycol; 1,4-bis-hydroxymethyl cyclohexane; 2-methyl-1,3-propane diol; glycerine; trimethylol-ethane and -propane; pentaerythritol; mannitol; sorbitol; formitol; sucrose; resorcin; hydroquinone; 2,2-bis-(4-hydroxyphenyl)-propane; ammonia; methylamine; ethylene diamine; tetra- or hexamethylene diamine; ethanolamine; diethanolamine; triethanolamine; aniline; 2,4- and 2,6-diaminotoluene; and polyphenyl-polymethylene polyamines, which can be obtained as a result of aniline-formaldehyde condensation; and also mixtures of these compounds. Resinous materials of the novolak and resole type are also suitable starting materials.

If the polyether used in making the polyurethane solution of the present invention contains a substantial amount of primary hydroxyl groups, the hydroxyl groups compete with the above-mentioned diols in the polyaddition reaction. The presence of such a polyether and a diol leads to a simultaneous reaction of the polyether and the diol with the isocyanate present thereby causing a significant undesirable increase in viscosity. Therefore, only those polyethers which contain at least 80%, and preferably at least 90%, secondary hydroxyl groups should be used in the practice of the present invention. To ensure that the polyether which is to be used in the present invention does contain at least 80% secondary hydroxyl groups, the polyether may be prepared by adding propylene oxide to the starting material or in admixture with propylene oxide at the start of polymerization. Then, toward the end of this polymerization, predominantly pure propylene oxide is added.

The primary hydroxyl compounds (i.e., diols) may be reacted with the isocyanates in the presence of the higher molecular weight polyethers which contain predominantly secondary hydroxyl groups according to processes known to those in the art. These processes may be carried out at temperatures of from 0° to 180° C., preferably from 30° to 150° C. In one such process, the hydroxyl component may be introduced into the polyether before addition of the isocyanate. The isocyanate may then be added all at once or gradually. A constant temperature may be maintained during the isocyanate addition by external or internal cooling. However, in many cases, it is also possible to carry out the reaction without cooling and to allow the temperature of the reaction mixture to rise by means of the exothermic reaction. In another method for making the polyurethane solution of the present invention, both reaction components may be introduced to the polyether from separate dosing apparatus with stirring. In this method, the hydroxy component should preferably be added so that reaction of the polyether with the isocyanate is substantially avoided.

Continuous processes for the preparation of the solutions of the present invention are also possible. For example, a solution of the hydroxyl component in the polyether (which may be preheated) may be combined with the isocyanate in a static or dynamic flow mixer. The reaction mixture may then be conveyed from the mixer into a stirrer vessel in which the reaction is completed. Vessels equipped with stirrers, reactors in series or cell-reactors are also suitable for carrying out the polyaddition reaction in a continuous manner.

If desired, the reaction may be accelerated by using conventional catalysts. Such catalysts include tertiary amines, amidines, metallic hydroxides, metallic alcoholates, metallic phenolates, metallic carboxylates and also carboxylates and chelates of the transition metals.

The stoichiometric ratio between the isocyanate and the primary hydroxyl compound (NCO/OH ratio) may be varied within wide limits, e.g., between from 0.20 to 1.2. It should be noted, however, that if the excess of hydroxyl compound is very large, a large amount of that compound remains unreacted and the chain length of the resulting polyurethanes is very short. If isocyanate is used in excess, the isocyanate reacts with the hydroxyl groups of the polyether, thereby causing a considerable increase in the viscosity of the solution. Therefore, NCO/OH ratios of between 0.5 and 1.0 are preferred in the preparation of the solutions according to the invention.

The polyurethane content of the solution is dependent upon the quantitative ratios chosen for the reaction. A polyurethane content of from 3 to 60% by weight (of the total solution) is appropriate in the present invention. Concentrations of from 5 to 30% are preferred, however, because concentrations below 5% effect only insignificant changes in the properties of the polyurethane plastics produced from the solutions and concentrations above 30% frequently result in high viscosities which interfere with processing.

The solutions of the present invention may be used as modified polyethers in the production of polyurethane plastics having improved mechanical properties. They may be used in the production of polyurethanes where higher molecular weight polyethers (such as those suitable as the reaction medium for the polyurethane solutions according to the invention) had been used.

Foaming is appropriately obtained with solutions having a content of dissolved polyurethane (A) in the polyethers (B) such that the content of (A) in the mixture of A+B is less than 20% by weight, better less than 15% by weight and preferably between 5 and 10% by weight. These polyurethane contents are in general adjusted by mixing appropriate amounts of the polyurethane-containing solutions with other polyether polyols. For technical reasons the concentration of the polyurethanes (A) in the polyurethane-containing polyether polyol solution have to be adjusted in such a way that these mixtures give a viscosity (25° C.) of less than 20.000 mPa's, better less than 10.000 mPa's which in most cases produces the above concentration limits. These concentration/viscosity limits result, inter alia, from the molecular weights of the polyurethanes and from possible chain-forming secondary reactions of the isocyanates and can thus be controlled.

The above-mentioned viscosity limits are not as important in other applications for example in the lacquer sector and may be higher in that field.

In addition to the polyurethane solution of the present invention, the polyisocyanates which have been described above and other higher molecular weight compounds having groups which are reactive toward isocyanates may be used in making a polyurethane plastic. Low molecular weight cross-linkers (usually hydroxy or amino functional compounds) may also be included in the polyurethane plastic. All of these compounds are well known in the art and are described in greater detail in the publications mentioned above. Use of the polyurethane solution of the present invention as a starting material is particularly advantageous because it results in a homogeneous polyurethane elastomer, polyurethane lacquer or adhesive. Foamed polyurethane plastics made with the polyurethane solution described herein also have improved physical properties.

The polyurethane solutions according to the invention are suitable for the trouble-free production of flexible foamed polyurethane plastics which are particularly suitable for flame-coating and high frequency bonding.

Foamed plastics containing urethane groups which are obtained by reacting polyisocyanates with polyether polyols and/or polyester polyols are known and are widely used. However, use of foamed polyurethanes has been limited in some areas because the known plastics were not suitable for high frequency bonding or for flame-coating. These bonding properties are particularly valuable in the production of door panels in cars which require foamed plastic sheets to be bonded together or with other materials. These bonding properties are also beneficial in the production of quilting effects or the production of molded bodies. Foamed products made with the polyurethane solution of the present invention may also be used in compound systems with textiles (e.g., padded coverings). Such compound systems are produced by flame-coating and are subsequently profiled and/or shaped by high frequency bonding.

It is known to produce foamed plastics having urethane groups which are suitable for high frequency bonding from compounds containing active hydrogen atoms, polyisocyanates, water and/or other blowing agents in the presence of emulsifiers, stabilizers, catalysts and other auxiliary agents and additives. Finished foamed plastics may also be rendered suitable for high frequency bonding by means of subsequent treatments known to those in the art. (See, e.g., French Pat. Nos. 1,329,849; 1,344,444 and 1,343,681.) Materials which may be used in such treatments to render foamed plastics suitable for high frequency bonding include: pulverized polyvinyl acetates, polyvinyl chlorides or copolymers (see, e.g., Belgian Pat. No. 719,875), thermoplastic polymers such as ethylene vinyl acetate, polyamides, cellulose derivatives such as ethyl or benzyl cellulose, acrylate polymers, polyethylene (see, e.g., German Offenlegungsschrift No. 1,767,583) and similar substances. Addition of water-soluble inorganic or organic salts (e.g., sodium thiosulfate or sodium acetate as described in German Offenlegungsschrift No. 1,669,888) to the foamed plastic also increases the suitability for high frequency bonding of polyurethane foamed plastics.

The addition of powders or thermoplastics which are dissolved in organic solvents to the starting materials used in the preparation of the polyurethane by known methods does have disadvantages, however. In order to obtain a noticeable effect upon the bonding properties of the polyurethane, large quantities of these powders or thermoplasts have to be used. The presence of such amounts of powder results in a considerable increase in viscosity, thereby causing difficulties in production. The foamed plastics are also adversely affected in their physical properties when these additives are incorporated in the composition.

Subsequent impregnation of the finished foamed plastics with powders or thermoplasts also presents problems. For example, it is very expensive to impregnate thicker foamed plastics. Removing the solvent and drying the subsequently treated foamed plastics also involves increased commercial expense. Moreover, subsequent treatment constitutes an additional processing step.

Thus, it can be seen that the prior art methods for improving the flame-coating and high frequency bonding capability of a polyurethane involve great commercial and financial expense and produce foamed plastics having poor physical properties.

It is also difficult to flame-coat such polyurethane foamed plastics, particularly foamed polyether plastics. Prior art methods for flame-coating require use of additives in the foam composition itself. Derivatives of phosphorous acid or phosphoric acid are exemplative of these additives.

The use of the solution of the present invention in the production of polyurethane flexible foamed plastics avoids the disadvantages described above and provides the required properties of flame-coatability and high frequency bondability in an outstanding manner.

Polyurethane solutions according to the invention which have been prepared by reacting diols which are condensates of the 1,3-propane diols and 1,1,1-trishydroxymethyl alkanes with a dicarboxylic acid with from 0.2 to 0.7 (preferably from 0.25 to 0.5) equivalents of polyisocyanate in polyethers having predominantly secondary hydroxyl groups are particularly suitable for the direct preparation of completely open-celled, "in situ reticulated" polyurethane flexible foamed plastics.

The open-celled structure of the polyurethane flexible foams prepared according to conventional processes is inadequate for many purposes. For example, when used as a filter material or as a starting material for impregnated foamed plastics, the flexible foamed plastic must be completely open-celled and membrane-free. While methods of preparing such "reticulated" foamed plastics are known to those in the art, foams made by these processes have been found unsuitable for many applications. One such prior art method requires after-treatment of the foam with a sodium hydroxide solution which dissolves the membrane between the cells. However, this treatment damages the cell bridges and necessitates a careful washing to remove the sodium hydroxide. Another known process is an explosion process in which an explosive gas mixture is allowed to penetrate into the foam before igniting the foam to rupture the remaining membranes. This latter process involves an additional working step and cannot be used when making large parts.

A process for the production of open-cell foamed plastics without after-treatment is described in German Offenlegungsschriften Nos. 2,210,721 and 2,454,049. According to this process, a membrane-free, "reticulated" foamed plastic is produced by foaming a mixture of approximately 20 parts of polyether polyol and 80 parts of polyester polyol. However, this process has many significant disadvantages such as difficulty in controlling the cell size and restriction of the block dimension due to the low stability of the system. The low hardness values of the foamed plastic produced by this method make it unsuitable for a number of applications.

Use of the polyurethane solutions of the present invention in making such open-celled, reticulated foams, however, substantially eliminates all of the disadvantages discussed above. Such flexible foamed plastics may be made from the previously mentioned starting components, water and/or other blowing agents, activators and optionally other auxiliary agents and additives. Completely open-celled foamed plastics which have good physical properties are obtained by direct block foaming (without subsequent treatment) when the polyurethane solution of the present invention is used. The cell size of the foam may be varied within the conventional limits by varying the pressure in the mixing chamber.

In making a foam from the polyurethane solution described herein, the reaction components may be reacted in a one-step process which is known to those in the art, a prepolymer process or a semiprepolymer process. Mechanical apparatus suitable for such foam production are described in U.S. Pat. No. 2,764,565. Other processng apparatus which may be used are described in Kunststoff-Handbuch, Vol. VII, published by Vieweg and Hochtlen, Carl-Hanser-Verlag, Munich 1966, e.g. on pages 121 to 205.

In producing foamed plastics from the polyurethane solution of the present invention, foaming is often carried out in molds. Metals such as aluminum or plastics such as epoxy resins are examples of suitable mold materials. The reaction mixture is charged into a mold where it foams up and forms the molded body. The mold foaming may be carried out so that the molded part has a cell structure on its surface but it may also be carried out so that the molded part has a compact skin and a cellular core. In using the solutions of the present invention in such molding operations, the foamable reaction mixture may be charged into the mold in an amount such that the molded foamed plastic just fills the mold. However, molding may also be carried out by charging more foamable reaction mixture into the mold than is necessary for filling the interior of the mold. The latter method, known as "overcharging" is described in U.S. Pat. Nos. 3,178,490 and 3,182,104.

In mold foaming, various "external mold release agents" which are known to those in the art (such as silicone fluid) may be used. However, it is also possible to use so-called "internal mold release agents". Mixtures of internal mold release agents and external mold release agents such as those described in German Offenlegungsschriften Nos. 2,121,670 and 2,307,589 may also be used.

Cold-hardening foamed plastics may also be produced from the solution of the present invention (compare British Pat. No. 1,162,517 and German Offenlegungsschrift No. 2,153,086). Foamed plastics may also be produced by block foaming or by the laminator process which is known to those in the art.

Having thus described our invention, the following Examples are given by way of illustration. Unless otherwise stated, the quantities given in these Examples are parts by weight or percent by weight.

EXAMPLES

EXAMPLES 1-26

Preparation of Polyurethane Solutions

EXAMPLE 1

208 g (2 mols) of neopentyl glycol were introduced into 1945.6 g of polyether I at 70° C. and during the course of 80 minutes, 278.4 g of TDI 80 were added dropwise with thorough stirring. (NCO/OH ratio 0.8). After another hour at 100° C., NCO groups could no longer be detected. A homogeneous, clear, transparent, 20% polyurethane solution was obtained having a calculated OH figure of 54.4. The viscosity was 10,700 mPas at 25° C.

In the following Examples, polyurethane solutions were produced in a substantially analogous manner, varying the polyether, diol, isocyanate, catalyst, NCO-/OH ratio, reaction time and reaction temperature. The process variables and properties of these solutions are given in Table I.

In each of the tables given herein, the following are represented thus:

Polyether I:

Started on trimethylol propane; in the chain 15% of ethylene oxide and 85% of propylene oxide; more than 95 mol % of secondary OH groups; hydroxyl number 45.

Polyether II:

Started on 90% of glycerine and 10% of propylene glycol-1,2; in the chain 10% of ethylene oxide and 90% of propylene oxide; more than 95 mol % of secondary OH groups; hydroxyl number 45.

Polyether III:

Started on 84% of trimethylol propane and 60% of propylene glycol-1,2; in the chain 10% of ethylene oxide and 90% of propylene oxide; more than 95 mol % of secondary OH groups; hydroxyl number 49.

Polyether IV:
Linear polypropylene glycol-polyether; hydroxyl number 56.
Polyether V:
Linear polypropylene glycol-polyether; hydroxyl number 112.
Ester I:

Tin dioctoate.
Catalyst Z:
Dibutyl tin dilaurate.
Catalyst Dabco:
Diazabicyclooctane.
Catalyst TI:
Titanic acid-tetrabutylester.

TABLE I

| Example No. | Polyether | Diol | Isocyanate | NCO/OH ratio | Polyurethane content | Quantity of catalyst (ppm) | Reaction Temp. (°C.) | Reaction Time (hrs.) | Calculated OH figure | Viscosity at 25° C. (mPas) |
|---|---|---|---|---|---|---|---|---|---|---|
| 2 | II | neopentylglycol | TDI | 0.8 | 20 | 100 SO | 100 | 0.5 | 55.2 | 41,000 |
| 3 | III | neopentylglycol | TDI | 0.8 | 20 | 200 SO | 120 | 0.3 | 57.6 | 25,800 |
| 4 | III | neopentylglycol | TDI | 0.8 | 20 | — | 100 | 2 | 63.2 | 12,350 |
| 5 | IV | neopentylglycol | TDI | 0.8 | 20 | — | 120 | 1 | 10.8 | 4,630 |
| 6 | V | neopentylglycol | TDI | 1.0 | 20 | — | 100 | 1 | 36.8 | 65,000 |
| 7 | II | neopentylglycol | TDI | 0.9 | 20 | 100 Dabco | 100 | 0.5 | 45.4 | 86,000 |
| 8 | II | neopentylglycol | TDI | 0.8 | 20 | — | 80 | 3 | 55.2 | 25,000 |
| 9 | II | neopentylglycol | TDI | 0.7 | 10 | 100 Z | 100 | 0.5 | 56.3 | 3,260 |
| 10 | II | neopentylglycol | TDI | 0.6 | 10 | 50 TI | 105 | 0.5 | 62.9 | 2,600 |
| 11 | II | neopentylglycol | TDI | 0.5 | 10 | 50 TI | 50 | 8 | 70.7 | 1,940 |
| 12 | II | neopentylglycol | IPDI | 1.0 | 20 | 150 SO | 130 | 3 | 44.8 | 11,300 |
| 13 | IV | neopentylglycol | MDI | 1.0 | 10 | 60 SO | 70 | 2 | 50.4 | 3,000 |
| 14 | IV | neopentylglycol | MDI | 0.25 | 6 | — | 80 | 3 | 46.5 | 720 |
| 15 | II | Ester I | TDI | 1.0 | 15 | 200 SO | 100 | 3 | 47.6 | 4,150 |
| 16 | IV | neopentylglycol | HDI | 1.0 | 20 | 100 SO | 120 | 0.5 | 39.2 | 122,000 |
| 17 | III | 2-hydroxy-methylbutanol-1 | TDI | 1.0 | 20 | 100 SO | 100 | 0.5 | 39.2 | 142,000 |
| 18 | III | 2-methyl-2-propyl-propane diol-1,3 | TDI | 1.0 | 20 | 100 SO | 120 | 2 | 39.2 | 150,000 |
| 19 | III | 2,2-diethyl-propane diol-1,3 | TDI | 0.8 | 29 | 50 SO | 100 | 0.5 | 51.1 | 61,300 |
| 20 | II | 2,2-bis-bromomethyl-propane diol-1,3 | TDI | 0.95 | 22.7 | 50 Dabco | 100 | 0.5 | 35.6 | 150,000 |
| 21 | II | 2-ethyl-2-chloromethyl-propane diol-1,3 | TDI | 0.8 | 23.7 | — | 100 | 3 | 52.7 | 18,400 |
| 22 | II | 2,2-bis-chloromethyl-propane diol-1,3 | TDI | 0.8 | 20 | — | 100 | 4 | 54.7 | 9,400 |
| 23 | II | 50% 3-chloro-propane diol-1,2 50% neopentyl glycol | TDI | 0.8 | 20 | — | 120 | 2 | 49.9 | 6,900 |
| 24 | II | Ester I | TDI | 0.8 | 20 | — | 120 | 2 | 47.1 | 13,300 |
| 25 | II | urethane diol | TDI | 0.8 | 20 | — | 110 | 2 | 36.8 | 68,300 |
| 26 | II | Ester II | TDI | 0.5 | 5.5 | — | 100 | 2 | 46 | 970 |

Hydroxypivalic acid-neopentylglycol ester.
Ester II:
Neopentylglycol-polyadipate of hydroxyl number 211.
Urethanediol:
Reaction product of trimethylolpropane and 6-chlorohexylisocyanate-1 in the molar ratio of 1:1.
TDI:
Toluylene diisocyanate (80% of 2,4- and 20% of 2,6-isomers).
IPDI:
5-isocyanato-1-isocyanato methyl-1,3,3-trimethylcyclohexane.
MDI:
4,4'-diphenylmethane-diisocyanate.
HDI:
Hexamethylene-diisocyanate.
Catalyst SO:

EXAMPLES 27–56
Production of Polyurethane Flexible Foamed Plastics

EXAMPLES 27–35

Flexible foamed plastics were produced from the solutions of Examples 1 to 5, varying the basic polyol and the concentration of dissolved polyurethane. The flexible foamed blocks were produced on a continuously operating high pressure machine. The process variables are summarized in Table II A. The foamed plastics thus obtained were then bonded using an electrode of 10 cm² surface area at a pressure of 9 kp/cm². More specifically, foamed plastic sheets of the prepared foams (each 10 mm thick) were bonded with a compound system consisting of a polyamide-velvet, an 8 mm foam sheet and a polyamide-charmeuse-fabric. The bonding voltage was 650 mV and the current strength was 480 mA. The physical properties of the foams are given in Table II B.

TABLE II A

| Example No. | Polyurethane solution (parts by wt/ Example No.) | Composition Polyether (parts by wt/#) | Water (parts by wt) | Foam Stabilizer (A) | Dimethyl-ethanolamine | Amine Activator (B) | Tin-(II)-octoate | TDI | NCO Index |
|---|---|---|---|---|---|---|---|---|---|
| 27 | 50/#1 | 50/I | 2.5 | 0.5 | 0.8 | 0.1 | 0.05 | 34.4 | 105 |
| 28 | 25/#1 | 75/I | 2.5 | 0.5 | 0.6 | — | 0.1 | 34.0 | 105 |
| 29 | 50/#2 | 50/II | 2.5 | 0.8 | 0.8 | 0.05 | 0.05 | 34.4 | 105 |
| 30 | 25/#2 | 75/II | 3.0 | 0.7 | 0.5 | 0.1 | 0.1 | 39.3 | 105 |
| 31 | 50/#3 | 50/I | 2.5 | 0.5 | 0.8 | 0.1 | 0.05 | 34.4 | 105 |
| 32 | 25/#3 | 75/I | 2.5 | 0.5 | 0.8 | 0.1 | 0.1 | 34.0 | 105 |

TABLE II A-continued

| Example No. | Polyurethane solution (parts by wt/ Example No.) | Composition Polyether (parts by wt/#) | Water (parts by wt) | Foam Stabilizer (A) | Dimethyl-ethanolamine | Amine Activator (B) | Tin-(II)-octoate | TDI | NCO Index |
|---|---|---|---|---|---|---|---|---|---|
| 33 | 25/#4 | 75/III | 2.7 | 0.8 | 0.8 | 0.1 | 0.12 | 36.9 | 105 |
| 34 | 25/#5 | 75/III | 2.7 | 0.5 | 1.0 | — | 0.15 | 38.6 | 105 |
| 35 | — | 100/II | 2.5 | 0.7 | 0.6 | 0.1 | 0.2 | 33.7 | 105 |

(A) Conventional flexible foam stabilizer (polyalkylene glycol-polysiloxane copolymer)
(B) Conventional amine activator (PS 207 of Bayer AG)

TABLE II B

| Physical Characteristics | Examples | | | | | | | | |
|---|---|---|---|---|---|---|---|---|---|
| | 27 | 28 | 29 | 30 | 31 | 32 | 33 | 34 | 35 |
| Specific gravity (kg/m³) | 37 | 36 | 38 | 29 | 36 | 35 | 32 | 33 | 38 |
| Tensile strength (kPa) | 130 | 140 | 140 | 110 | 140 | 120 | 125 | 140 | 105 |
| Breaking elongation (%) | 175 | 210 | 350 | 140 | 220 | 150 | 230 | 310 | 230 |
| Strain hardness at 40% (kPa) | 3.9 | 3.6 | 3.45 | 4.5 | 4.6 | 3.8 | 4.0 | 3.7 | 3.95 |
| Residual pressure deformation at 90% (%) | 7.5 | 4.8 | 7.6 | 5.9 | 4.4 | 4.9 | 3.5 | 4.8 | 3.4 |
| Strain hardness reduction according to the Ford test (%) | 28 | 21 | 25 | 35 | 40 | 38 | 38 | 40 | 35 |
| Residual pressure deformation (90%) according to the Ford test (%) | 16 | 12 | 12 | 17 | 19 | 12 | 8 | 9 | 11 |
| Bonding time foam/foam (sec) | 8 | 10 | 8 | 10 | 8 | 10 | 9 | 9 | 15 |
| Bonding time foam/polyamide compound (sec) | 1.5 | 2.5 | 1.5 | 2.5 | 1.5 | 2.5 | 2 | 2 | 8 |

It can be seen from Table II B that foamed plastics are open-celled and are easily flame-coatable with textile covering layers. The bonding seams obtained in Examples 27 to 34 were clearly stamped out, were free of ruptures and exhibited a strong adhesion.

EXAMPLES 36-41

In the following Examples, flexible elastic foamed plastics were produced from the polyurethane solutions of Examples 6-11 in polyether-polyols by the method used in Examples 27-35. The molar reaction ratios of neopentylglycol T80 and the concentration of dissolved polyurethane were varied. The composition of these foams is given in Table III A and the properties of the foam are presented in Table III B.

TABLE III A

| Example No. | Polyurethane solution (parts by wt/ Example No.) | Composition Polyether (parts by wt/#) | Water (parts by wt) | Foam Stabilizer (A) | Dimethyl-ethanolamine | Amine Activator (B) | Tin-(II)-octoate | TDI | NCO Index |
|---|---|---|---|---|---|---|---|---|---|
| 36 | 50/#6 | 50/II | 2.5 | 0.7 | 1.0 | 0.05 | 0.07 | 32.9 | 105 |
| 37 | 50/#7 | 50/II | 2.5 | 0.7 | 0.8 | 0.1 | 0.05 | 33.6 | 105 |
| 38 | 50/#8 | 50/II | 2.5 | 0.8 | 0.8 | 0.1 | 0.05 | 34.4 | 105 |
| 39 | 100/#9 | — | 2.5 | 0.8 | 0.9 | 0.1 | 0.015 | 35.4 | 105 |
| 40 | 100/#10 | — | 2.5 | 0.7 | 1.0 | 0.1 | 0.015 | 36.4 | 105 |
| 41 | 100/#11 | — | 2.5 | 0.7 | 1.0 | 0.1 | 0.015 | 37.8 | 105 |

(A) Conventional flexible foam stabilizer (polyalkylene glycol-polysiloxane copolymer)
(B) Conventional amine activator (PS 207 of Bayer AG)

TABLE III B

| Physical Characteristics | Examples | | | | | |
|---|---|---|---|---|---|---|
| | 36 | 37 | 38 | 39 | 40 | 41 |
| Specific gravity (kg/m³) | 37 | 37 | 35 | 35 | 36.5 | 35 |
| Tensile strength (kPa) | 130 | 140 | 140 | 145 | 175 | 140 |
| Breaking elongation (%) | 185 | 180 | 350 | 415 | 375 | 330 |
| Strain hardness at 40% (kPa) | 5.9 | 5.85 | 3.45 | 3.4 | 3.65 | 3.5 |
| Residual pressure deformation at 90% (%) | 8.3 | 8.5 | 7.6 | 11 | 14 | 18 |
| Strain hardness reduction according to the Ford test (%) | 35 | 32 | 25 | 24 | 32 | 11 |
| Residual pressure deformation according to the Ford test (%) | 17 | 14 | 12 | 18 | bonds | 64 |
| Bonding time foam/foam (sec) | 10 | 9 | 8 | 8 | 7 | 6 |
| Bonding time foam/ polyamide compound (sec) | 2.5 | 2.0 | 1.5 | 1.5 | 1.5 | 1.3 |

These foamed plastics were open-celled and were easily flame-coatable with textile covering layers. The bonding seams were clearly stamped out, were without any disturbances and exhibited a strong adhesion.

EXAMPLES 42-44

In the following Examples, flexible elastic foamed plastics were prepared from the polyurethane solutions in polyether-polyols of Examples 12, 13 and 15. The isocyanate component of the polyurethane prepared in situ and the concentration of the solution were varied. The foamed plastics were produced according to the hand foaming process (i.e., intimately mixing the components [excluding the isocyanate] in a cardboard beaker, adding the isocyanate, further stirring and the reaction mixture foaming up in a rectangular paper container). The high frequency bonding was carried out as described above. The foam composition and properties are given in Tables IV A and IV B.

foaming method used was that described in Examples 42-44. The bonding method was that used in Examples

TABLE IV A

| Example No. | Polyurethane solution (parts by wt/ Example No.) | Composition Polyether (parts by wt/#) | Water (parts by wt) | Foam Stabilizer (A) | Dimethyl-ethanolamine | Amine Activator (B) | Tin-(II)-octoate | TDI | NCO Index |
|---|---|---|---|---|---|---|---|---|---|
| 42 | 25/#12 | 75/II | 2.5 | 0.8 | 1.0 | — | 0.15 | 33.8 | 105 |
| 43 | 50/#13 | 50/II | 2.5 | 0.8 | 1.0 | — | 0.2 | 34.1 | 105 |
| 44 | 33.3/#15 | 66.7/II | 2.5 | 0.8 | 1.0 | — | 0.15 | 33.7 | 105 |

(A) Conventional flexible foam stabilizer (polyalkylene glycol-polysiloxane copolymer)
(B) Conventional amine activator (PS 207 of Bayer AG)

27-35. The foam compositions and properties are given in Tables V A and V B.

TABLE V A

| Example No. | Polyurethane solution (parts by wt/ Example No.) | Composition Polyether (parts by wt/#) | Water (parts by wt) | Foam Stabilizer (A) | Dimethyl-ethanolamine | Amine Activator (B) | Tin-(II)-octoate | TDI | NCO Index |
|---|---|---|---|---|---|---|---|---|---|
| 45 | 25/#16 | 75/III | 2.7 | 0.5 | 0.8 | — | 0.5 | 35.6 | 105 |
| 46 | 50/#17 | 50/I | 2.5 | 0.5 | 0.8 | — | 0.25 | 33.2 | 105 |
| 47 | 50/#18 | 50/I | 2.5 | 0.5 | 0.5 | — | 0.04 | 33.2 | 105 |
| 48 | 50/#19 | 50/I | 2.5 | 0.5 | 0.8 | — | 0.025 | 34.1 | 105 |
| 49 | 50/#20 | — | 3.0 | 0.8 | 0.6 | — | 0.05 | 38.1 | 105 |
| 50 | 50/#21 | 50/II | 2.5 | 0.5 | 0.8 | 0.05 | 0.03 | 31.0 | 95 |
| 51 | 50/#22 | 50/II | 2.5 | 0.8 | 0.9 | 0.1 | 0.07 | 34.4 | 105 |
| 52 | 50/#23 | 50/II | 2.5 | 0.7 | 0.5 | — | 0.05 | 34.0 | 105 |
| 53 | 50/#24 | 50/II | 2.5 | 0.5 | 0.5 | 0.1 | 0.05 | 33.7 | 105 |
| 54 | 25/#25 | 75/II | 2.5 | 0.6 | 0.5 | 0.1 | 0.15 | 33.3 | 105 |

(A) Conventional flexible foam stabilizer (polyalkylene glycol-polysiloxane copolymer)
(B) Conventional amine activator (PS 207 of Bayer AG)

TABLE V B

| Physical Characteristics | Examples |||||||||| 
|---|---|---|---|---|---|---|---|---|---|---|
| | 45 | 46 | 47 | 48 | 49 | 50 | 51 | 52 | 53 | 54 |
| Specific gravity (kg/m$^3$) | 34.5 | 37 | 36 | 36.5 | 31 | 36 | 36 | 37 | 39 | 39 |
| Tensile strength (kPa) | 150 | 125 | 140 | 120 | 115 | 135 | 120 | 175 | 165 | 165 |
| Breaking elongation (%) | 270 | 220 | 140 | 239 | 219 | 330 | 200 | 250 | 200 | 220 |
| Strain hardness at 40% (kPa) | 4.8 | 3.9 | 4.1 | 4.3 | 3.8 | 3.4 | 3.8 | 4.0 | 4.0 | 5.7 |
| Residual pressure deformation at 90% | 4.5 | 5.6 | 7.8 | 3.9 | 4.7 | 7.2 | 6.1 | 4.5 | 8.3 | 8.9 |
| Strain hardness reduction according to the Ford test (%) | 35 | 40 | 35 | 30 | 38 | 41 | 44 | 33 | 25 | 32 |
| Residual pressure deformation according to the Ford test (%) | 15 | 18 | 26 | 17 | 38 | 17 | 19 | 12 | 18 | 17 |
| Bonding time foam/foam (sec) | 10 | 9 | 9 | 5 | 7 | 5 | 5 | 12 | 9 | 12 |
| Bonding time foam/polyamide-velvet compound (sec) | 2.5 | 2.0 | 2.0 | 1.3 | 1.3 | 1.0 | 1.0 | 3.0 | 1.5 | 3.0 |

TABLE IV B

| Physical characteristics | Examples |||
|---|---|---|---|
| | 42 | 43 | 44 |
| Specific gravity (kg/m$^3$) | 36.5 | 36 | 38 |
| Tensile strength (kPa) | 150 | 150 | 135 |
| Breaking elongation (%) | 390 | 470 | 415 |
| Strain hardness (40%) (kPa) | 3.25 | 3.1 | 3.2 |
| Residual pressure deformation 90% (%) | 5.8 | 12 | 6.4 |
| Bonding time foam/foam (sec) | 9 | 9 | 9 |
| Bonding time foam/polyamide-velvet (sec) | 2.0 | 2.0 | 2.0 |

The foamed plastics thus obtained were open-celled and were easily flame-coated with textile covering layers. The quality of the bonding seams was the same as that of Examples 27-35.

EXAMPLES 45-54

In the following Examples, flexible elastic foamed plastics were prepared from the polyurethane solutions in polyether-polyols of Examples 16-25, varying the diol component of the dissolved polyurethane. the The foamed plastics thus obtained were open-celled and were easily flame-coated with textile covering layers. The bonding seams were clearly stamped out, free of ruptures and exhibited a strong adhesion.

EXAMPLES 55-56

From the solutions of Examples 14 and 26, open-cell flexible foamed plastics were produced on the same machine. The extent to which the foam was open-celled was determined according to a standard method by measuring the resistance which a defined foamed molded body makes against a standard flow of air. The figures given are divisions of a scale which ranges from 0 (zero: without foamed plastics) to 350 (closed-cell foam). A conventional open-cell polyether foam has a value of 45 on this scale and a polyester foam which is reticulated according to the explosion process has a value of 15. The composition and physical properties of these foams are given in Tables VI A and VI B.

TABLE VI A

| Example No. | Polyurethane solution (parts by wt/ Example No.) | Composition Polyether (parts by wt/#) | Water (parts by wt) | Foam Stabilizer (A) | Dimethyl-ethanolamine | Amine Activator (B) | Tin-(II)-octoate | TDI | NCO Index |
|---|---|---|---|---|---|---|---|---|---|
| 55 | 100/#14 | — | 4.0 | 1.0 | — | 0.1 | 0.07 | 52.3 | 105 |
| 56 | 100/#16 | — | 4.0 | 1.0 | 0.2 | 0.1 | 0.1 | 50.8 | 105 |

(A) Conventional flexible foam stabilizer (polyalkylene glycol-polysiloxane copolymer)
(B) Conventional amine activator (PS 207 of Bayer AG)

TABLE VI B

| Physical Characteristics | Examples | |
|---|---|---|
|  | 55 | 56 |
| Specific gravity | 24 | 26 |
| Tensile strength (kPa) | 110 | 160 |
| Breaking elongation (%) | 240 | 250 |
| Strain hardness at 40% (kPa) | 3.25 | 4.1 |
| Residual pressure deformation at 90% (%) | 8.3 | 11 |
| Strain hardness reduction according to the Ford test (%) | 18 | 20 |
| Residual pressure deformation according to the Ford test (%) | 8.9 | 15 |
| Extent of open-cell feature (according to the measuring method described above) | 20 | 20 |

What is claimed is:

1. A solution of a polyurethane in a polyol comprising:
   (a) the reaction product of a polyisocyanate with a diprimary diol, said diprimary diol having a molecular weight of from 90 to 800 and a structure at both hydroxyl groups corresponding to the general formula:

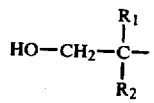

in which
   $R_1$ represents chlorine or an alkyl, cycloalkyl, aralkyl or aryl radical having from 1 to 10 carbon atoms, which radical may be substituted or interrupted by chlorine, ester groups, ether groups, amide groups, urethane groups or nitrile groups, and
   $R_2$ represents hydrogen or a radical within the definition of $R_1$; and
   (b) a polyether with an average molecular weight of from 500 to 12,000 having at least two hydroxyl groups, in which at least 80% of the hydroxyl groups are secondary;
with the reaction product (a) comprising from 3 to 60 wt. % of the solution.

2. The solution of claim 1 further comprising a second diol which has a molecular weight of from 104 to 800 and only one hydroxyl group corresponding to the general formula and which second diol constitutes less than 50 mol % of total diol present.

3. The solution of claim 1 further comprising an alcohol having no hydroxyl groups corresponding to the general formula, which alcohol constitutes no more than 20 mol % of total diol present.

4. The solution according to claim 1 wherein the polyether component (b) has an average molecular weight of from 1,000 to 8,000.

5. The solution of claim 1 wherein at least 90% of the hydroxyl groups of the polyether (b) are secondary hydroxyl groups.

6. The solution of claim 1 wherein the polyisocyanate is selected from the group consisting of 2,4-toluylene diisocyanate, 2,6-toluylene diisocyanate, and mixtures thereof.

7. The solution of claim 1 wherein the diprimary diol is selected from the group consisting of (i) 1,3-propane diols which are disubstituted in the 2-position; (ii) 1,3-propane diols which are mono-substituted in the 2-position; (iii) reaction products of 1 mol of a 1,1,1-tris-hydroxymethyl alkane with 1 mol of a monoisocyanate or a monocarboxylic acid; and (iv) polyesters having a molecular weight of up to 800 produced from the compounds (i), (ii) or (iii) with a dicarboxylic acid.

8. The solution of claim 1 wherein the diprimary diol is neopentyl glycol.

9. The solution of claim 1 wherein the reaction product (a) is prepared from the polyisocyanate and diprimary diol in quantities such that the NCO/OH equivalent ratio is between 0.5:1 and 1:1.

10. The solution of claim 1 wherein the diprimary diol is a polyadipate of neopentyl glycol.

11. The solution of claim 1 wherein the diprimary diol is a hydroxy pivalic acid-neopentyl glycol ester.

12. The solution of claim 10 or 11 wherein the NCO-/OH ratio is between 0.2 and 0.7.

13. Solutions according to claim 1, characterized in that component (A) is dissolved in such a quantity of polyether diols (B) that the content of (A) in the mixture (A)+(B) is less than 20% by weight.

14. Solutions according to claim 1, characterized in that the viscosity of the solution is less than 20.000 mPa.s.

15. A process for the production of polyurethane flexible foamed plastics comprising reacting polyisocyanates with high molecular weight compounds having at least two hydroxyl groups and water, characterized in that the higher molecular weight compound having at least two hydroxyl groups is a solution comprising:
   (a) the reaction product of a polyisocyanate and a diprimary diol, said diol having a molecular weight of from 90 to 800 and a structure at both hydroxyl groups corresponding to the formula:

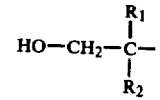

wherein
   $R_1$ represents chlorine, an alkyl, cycloalkyl, aralkyl or aryl radical having from 1 to 10 carbon atoms, which carbon atoms may be substituted or interrupted by chlorine, ester groups, ether groups, amide groups, urethane groups, nitrile groups or a combination of such groups, and $R_2$ represents hydrogen or a radical within the definition of $R_1$; and (b) a polyether with an average molecular weight of from 500 to 12,000, said polyether having at least two hydroxyl groups with at least 80% of said hydroxyl groups being secondary hydroxyl groups.

16. The process of claim 15 wherein a blowing agent other than water is used.

17. The process of claim 15 wherein a catalyst is used.

18. The process of claim 15 wherein a foam stabilizer is used.

19. The process of claim 15 wherein the diprimary diol is a polyadipate of neopentyl glycol or a hydroxy pivalic acid-neopentyl glycol ester.

20. The process of claim 19 wherein the NCO to OH equivalent ratio is 0.2 to 0.7.

* * * * *